United States Patent [19]

Jensen et al.

[11] Patent Number: 4,636,345
[45] Date of Patent: Jan. 13, 1987

[54] METHOD OF ROLLING A PLASTICALLY DEFORMABLE MATERIAL

[75] Inventors: Hans E. W. Jensen, Støvring; Johan C. Gregersen, Søborg, both of Denmark

[73] Assignee: Dansk Eternit-Fabrik A/S, Aalborg, Denmark

[21] Appl. No.: 618,753

[22] Filed: Jun. 8, 1984

Related U.S. Application Data

[63] Continuation of Ser. No. 389,101, Jun. 16, 1982, abandoned.

[30] Foreign Application Priority Data

Jun. 16, 1981 [DK] Denmark ............... 1955/81

[51] Int. Cl.$^4$ .............................................. B28B 3/12
[52] U.S. Cl. ..................... 264/122; 106/98; 106/99; 425/371; 425/373
[58] Field of Search ............. 264/122; 425/84, 371, 425/373; 106/98, 99

[56] References Cited

U.S. PATENT DOCUMENTS

| | | | |
|---|---|---|---|
| 3,565,650 | 2/1971 | Gordon | 264/122 |
| 3,669,700 | 6/1972 | Beach et al. | 106/98 |
| 3,754,954 | 8/1973 | Gabriel et al. | 106/98 |
| 3,880,664 | 4/1975 | Schulze | 106/98 |
| 3,972,972 | 8/1976 | Yano et al. | 106/99 |
| 4,111,711 | 9/1978 | Kiehl et al. | 106/98 |
| 4,246,036 | 1/1981 | Anton | 106/99 |
| 4,287,142 | 9/1981 | Holbek | 106/98 |
| 4,325,686 | 11/1980 | Leon et al. | 425/371 |
| 4,398,960 | 8/1983 | Murray | 106/98 |

FOREIGN PATENT DOCUMENTS

0078476 6/1981 Japan ...................... 106/98

Primary Examiner—Donald Czaja
Assistant Examiner—Mary Lynn Fertig
Attorney, Agent, or Firm—Stiefel, Gross, Kurland & Pavane

[57] ABSTRACT

A method of rolling a plastically deformable material which behaves as a single phase and which is deformed plastically when subject to deformation forces, which material comprises from 40% to 70% by weight of hydraulic cement and/or fly-ash particles A of from 0.5 to 100 μm, silica particles B of from 50 Å to 0.5 μm (which are at least one order of magnitude smaller than the cement/fly-ash particles A), a surface-active dispersing system present in an amount sufficient to impart to the composite material a plastic consistency in a stress field of up to 200 kg/cm sq., and from 7% to 20% by weight water; the silica particles B being homogeneously arranged in the voids between the densely packed cement/fly-ash particles A, and the amount of water substantially corresponding to the amount necessary to fill the voids between the solid particles of the composite material. In accordance with the method, the composite material is introduced into a wedge-like space defined between oppositely arranged surface parts, at least one of which is gas-permeable, e.g., a continuous band or belt, and the surface parts are moved relative to the material so as to entrain or roll it towards and through the throat or gorge of the space. The plastically deformable material retains substantially all of its original water content and continues to behave as a one-phase, plastically deformable material after rolling, and possesses a substantially smooth and uniform outer surface without material defects.

20 Claims, 4 Drawing Figures

METHOD OF ROLLING A PLASTICALLY DEFORMABLE MATERIAL

This is a continuation of application Ser. No. 389,101, filed June 16, 1982, now abandoned.

BACKGROUND OF THE INVENTION

The present invention relates to shaped articles prepared from a plastically deformable composite material, to a composite material per se, to a method for rolling a plastically deformable material, and to an apparatus for rolling a plastically deformable material.

International Patent Application No. PCT/DK79/00047 discloses a particular type of material comprising a matrix, the matrix comprising densely packed particles A having a size of the order of 0.5–100 μm, in particular densely packed cement particles, and inorganic solid particles B having a size of from about 50 Å to about 0.5 μm and being at least one order of magnitude smaller than the respective above-mentioned particles, in particular ultrafine silica particles, the smaller particles being homogeneously arranged and preferably densely packed in the voids between the larger particles.

Such materials, in the following designated DPS materials (Densified Systems containing ultrafine Particles), specifically cement-based DSP materials (that is, DSP marterials in which the particles having a size of the order of 0.5–100 μm are cement particles), show a number of highly interesting properties, including high density, high tensile, bending and compressive strength, good durability, and extraordinarily good ability to anchor reinforcing bodies, including fibers, embedded in the matrix.

Due to their improved properties, cement-based DSP materials are highly desirable materials for building products, including thin-walled panels and components of the types which are nowadays often made of asbestos-reinforced cement. Due to the excellent plastic properties of the uncured DSP composite material, an attractive method for shaping such articles of DSP is a plastic deformation or compression process.

The present invention relates to important new developments connected to the preparation of shaped articles from DSP materials, in particular by plastic deformation such as extrusion, rolling, or compression.

In connection with the development of practical methods and apparatuses for the plastic deformation of the DSP materials, various new aspects of the composition and working of DSP materials have been investigated and have given rise to new developments.

One aspect of the present invention relates to compositions of cement-based DSP materials which are especially suitable for plastic deformation processes, and to shaped articles made from such compositions. Another aspect of the present invention relates to a method for rolling a DSP material or other plastically deformable material.

In the present context, the term "plastically deformable material" designates a material which, as a single phase, is deformed plastically when subjected to deformation forces such as hydrostatic pressure and displacement compulsion, including shear, as contrasted to materials which are shaped from a two-phase system such as a cement-water slurry from which liquid phase is removed during the shaping process ("slip casting"). One characteristic of cement-based DSP materials is that although they comprise cement particles and water, they show such a water retention and such an internal coherence that substantially no water will be removed from them during processing, including deformation, so that the plastic DSP paste behaves as a one phase plastically deformable material.

As disclosed in the above-mentioned International Patent Application No. PCT/DK79/00047, the particular properties of the cement-based DSP materials are ascribable to the dense packing of the cement particles with homogeneously distributed and preferably densely packed ultrafine particles in the voids between the cement particles, the dense packing of the cement particles and the simultaneous homogeneous arrangement of the ultrafine particles, in particular ultrafine silica, being obtained by a unique combination of a critical amount of water in the paste and an unconventionally high dosage of a surface-active dispersing agent, in particular a concrete superplasticizer. As surface forces which would otherwise lead to "particle locking" between the cement particles and between the ultrafine particles have been overcome by means of the high dosage of the surface-active dispersing agent, a system has been obtained in which the resistance to particle packing is solely due to particle geometry.

In the practical exploitation of cement-based DSP materials for the mass-production of shaped articles by plastic deformation, it has been found that certain problems may arise which have been solved through the principles of the present invention.

Thus, it has been found that when processing cement-based DSP materials consisting of, e.g., cement, ultrafine silica, water, concrete superplasticizer, and fibers, the processing-relevant properties of the fresh paste such as the resistance to shear deformation may vary to an undesirably high degree dependent on the time elapsed after mixing of the material. Thus, the period of time during which the material has plastic deformation properties within desirable limits may become too small for production on an industrial scale. This is the case when such a formulation is intended for extrusion. In order to possess a consistency suitable for extrusion, the formulation should have an extremely low water/dry matter ratio within narrow limits. However this extremely low water/dry matter ratio leads to serious problems in controlling the consistency of the material, and the material when shaped by plastic deformation appears with a cracky, crusty surface. Even small changes in the water/dry matter ratio of the above-mentioned basic material may give rise to serious problems:

Even a minor reduction in the water content to below a critical minimum, e.g., caused by surface evaporation, will lead to an unsaturated densely packed particle structure. The unsaturation will very soon result in solidification of the material, whereupon the material is no longer suitable for plastic deformation shaping such as low pressure extrusion, calendering or compression shaping. Throughout the present specification, "low pressure" in connection with plastic deformation shaping is intended to designate hydrostatic shaping pressures below 10 MPa.

On the other hand, even a slight excess of water compared to the critical amount results in a material which becomes sticky and is unsuitable for platic deformation extrusion as water will separate from the material into slip zones during the plastic deformation and the coherent nature of the material will be lost.

SUMMARY OF THE INVENTION

Hence, one major object of the present invention is to decrease the sensitivity of the cement-based DSP materials to small changes in the water content and to expand the period during which the DSP material is suitable for processing by plastic deformation.

According to one main aspect of the present invention, this has been obtained by incorporating, in the DSP paste, particles of a solid plasticizing agent.

In the present context, the term "solid plasticizing agent" designates a plasticizing agent which is in the form of particles which are typically at least one order of magnitude smaller than the cement particles and which show surface-active or dispersing properties in the cement-based DSP system, typically particles which are known plasticizers in pastes or slurries for inorganic matrix-based materials, such as ball clay (china clay), the particles of which typically have a flaky-hexagonal shape. While the exact function of the solid plasticizer in the DSP system is not known with certainty, it is assumed that the particles of the solid plastizicer such as ball clay will obtain a negative charge all over their surface (both at the edges and the surface thereof) in the highly alkaline environment (pH above 10) and will adhere to cement particles due to electrostatic forces. Due to their negative surface charge, ball clay particles on adjacent cement particles will repulse each other, thus preventing the cement particles from flocculating.

According to the invention, the particles B are suitably particles of ultrafine silica having a specific surface area of about 50,000–2,000,000 cm$^2$/g, in particular about 250,000 cm$^2$/g, and the particles C are suitably ball clay particles.

According to another aspect of the present invention, an improved processability in plastic deformation processes, e.g., lower extrusion pressure necessary to obtain a good result, improved internal coherence, a prolonged pot life in processable condition, a smoother surface of the plastically deformed material, and an increased bending strength of the matrix, is obtained by incorporating bodies (D) having an aspect ratio of about 3:1–100:1 and a diameter of the order of 0.5–10 μm, such as smooth, rod-like or acicular bodies, e.g., fine mineral wool or wollastonite, in particular such bodies having an aspect ratio of about 3:1–20:1, in the plastically deformable material. Thus, the presence of bodies D is generally preferred in the articles of the invention comprising bodies C, but the presence of bodies D, without the simultaneous presence of bodies C, also results in the above-mentioned improvements ascribable to bodies D. The bodies D are believed to decrease the tendency of the material to form internal flaws which otherwise may take place in slip planes generated during the plastic deformation, and are also believed to decrease, through a micro reinforcing effect in the uncured paste, notch effects arising around fibers or angular particles in the matrix, thus providing improved internal coherence. Hence, another aspect of the invention comprises a shaped article comprising a matrix, the matrix comprising (A) a coherent structure comprising substantially densely packed inorganic solid particles of a size of 0.5–100 μm, (B) substantially densely packed inorganic solid particles having a size of from about 50 Å to about 0.5 μm and being at least one order of magnitude smaller than the particles A, or a coherent structure formed from such homogeneously arranged particles, the particles B being homogeneously arranged in the voids between the particles A, the dense packing being substantially a packing corresponding to the one obtainable by gentle mechanical influence on a system of geometrically equally shaped large particles in which locking surface forces do not have any significant effect, (D) additional bodies having an aspect ratio of about 3:1–100:1 and a diameter of the order of 0.5–10 μm, and optionally (C) particles of a solid plasticizing agent, and/or (E) reinforcing fibres having an aspect ratio of at least 100:1.

According to the invention, the particles B are suitably particles of ultrafine silica having a specific surface area of about 50,000–2,000,000 cm$^2$/g, in particular about 250,000 cm$^2$/g, and the particles C are suitably ball clay particles.

The reinforcing fibers E may typically include synthetic organic fibers (polymer fibers) which have been found suitable for incorporation in cement-based materials, such as plastic fibers, including polypropylene fibers, polyvinyl alcohol fibers, or aromatic nylon fibers, and/or they may include inorganic fibers, including glass fibers, mineral wool fibers, asbestos fibers, metal fibers, and aluminum silicate fibers, and/or they may include cellulose fibers, including cotton fibers. The selection of reinforcing fibers or combinations of reinforcing fibers will depend upon the desired characteristics of the articles to be produced.

Normally, the particles A constitute about 40–70 percent by weight of the matrix and comprise hydraulic cement in an amount of about 25–70 percent by weight of the matrix and optionally fly ash in an amount of about 15–40 percent by weight of the matrix, particularly at the most about 25 percent by weight of fly ash and about 45 percent by weight of cement. The maximum amount of fly ash relative to cement is normally 1:1. The particles B preferably constitute about 5–30 percent by weight of the matrix, preferably about B 10–25 percent by weight.

Preferably, the particles C, in particular ball clay particles, constitute 2–10 percent by weight of the matrix, preferably 3–7 percent by weight, more preferably 4–6 percent by weight.

The bodies D preferably constitute about 5–30 percent by weight of the matrix, preferably about 10–25 percent by weight, although the ranges of about 5–20, in particular 8–15, percent by weight are also interesting.

According to a particular aspect of the invention, sand may be incorporated in an amount of up to about 40 percent by weight. When the material is to be prepared in thin panels, the sand will normally be of a size of between 0.1 mm and 1 mm; otherwise, it may be of a size of up to about 5 mm. The sand will contribute to an increase in the dimensional stability of the final product. Any loss of strength incurred due to the incorporation of sand may be counteracted by autoclaving. When reinforcing fibers E are present, they preferably constitute 0.5–10 percent by weight of the matrix.

In accordance with the explanation given above, the matrices defined above are particularly suitable for plastic deformation, and hence, the shaped articles showing the above characteristics are typically made by plastic deformation such as extrusion, rolling, and/or compression.

One typical kind of shaped article according to the invention is an article which has been shaped by rolling of the DSP material into a sheet and subsequent subdivision of the sheet, such as, e.g., a sheet, slate, or shingle for application as a cover or coating on other structures, typically a slate or shingle for use as a roofing material.

According to another aspect of the present invention, an improved processability in plastic deformation processes and a prolonged pot life in processable condition, with extended useful range of water/dry matter ratios, is obtained by using a dispersing agent of the thickener type, preferably in combination with one or more of the above-mentioned processability-improving measures and/or in combination with other dispersing systems such as will be explained below.

Examples of dispersing agents of the thickener type are water dispersible polymers such as non-ionic cellulose derivatives, e.g., hydroxyethylcellulose ethers.

Thus, e.g., it has been found that combinations of
  dispersing agents of the concrete superplasticizer type, typically of the type represented by alkali or alkaline earth metal salts of high condensed naphthalene sulphonic acid/formaldehyde condensates, typically of the type of the "Mighty" (described below) and "Lomar D" (a highly polymerized naphthalene sulphonate condensate),
with
  compatible dispersing agents of the thickener type, such as non-ionic cellulose derivatives, typically medium viscosity nonionic cellulose derivatives which are readily soluble in water at pH above 10 and which have a uniform substitution of the hydroxy groups on the cellulose molecules, typically medium viscosity hydroxyethylcellulose ethers such as NATROSOL 250 H4BR, NATROSOL 250 HBR, NATROSOL 250 MHBR, and NATROSOL 250 MBR
result in cement-based DSP materials having a prolonged pot life and expanded range of water/dry matter ratios over which they retain suitable properties for plastic deformation, including suitable viscosity, without any stickiness or liquid separation during the plastic deformation, and shaped articles made from such materials by processes including plastic deformation will have matrix properties which are as good as or even better than the matrix properties of articles made from similar DSP materials, but without the dispersing agent of the thickener type.

According to one aspect of the present invention, dispersing agents of the above-mentioned thickener type are used as the only dispersing system in the DSP material. In such case the material is subjected to a high shear mixing in the plastic state, such as by intense kneading or roll milling, and the thickener may be a thickener of the medium viscosity type, or even a thickener of the high viscosity type such as hydroxypropylmethyl cellulose such as Methocel 15MS from Dow.

According to a further aspect of the present invention, it has been found that a combination of a soluble salt of a polymeric sulphonate plasticizer and a melamine concrete superplasticizer is effective in a smaller amount, on a weight basis, than either of these superplasticizers alone. Therefore, an aspect of the present invention comprises cement-based DSP materials containing such a combination, in particular cement-based DSP materials which also, in accordance with the above-discussed aspects of the invention, comprise a solid plasticizer such as ball clay.

In the composite materials of the invention, the water will normally constitute 7–20 percent by weight. The dispersing system will normally constitute about 1–4 percent by weight. When the dispersing system comprises a concrete superplasticizer in combination with a thickener type dispersing agent such as a water soluble polymer, the system will normally comprise 1–2 percent by weight of the concrete superplasticizer and 0.01–0.08 percent by weight of the water soluble polymer, calculated on the composite material.

The above-mentioned aspects of the invention involving the use of special dispersing systems in cement-based DSP materials may be summarized as a composite material for producing a shaped article, comprising
  (A) inorganic solid particles of a size of 0.5–100 μm, in particular hydraulic cement particles and optionally fly ash particles,
  (B) inorganic solid particles having a size of from about 50 Å to about 0.5 μm and being at least one order of magnitude smaller than the cement particles A,
and optionally,
  (C) particles of a solid plasticizing agent,
  (D) additional bodies having an aspect ratio of about 3:1–100:1 and a diameter of the order of 0.5–10 μm,
and/or
  (E) reinforcing fibres having an aspect ratio of at least 100:1.
water,
and a surface-active dispersing system which comprises,
  (i) a combination of a soluble salt of a polymeric sulphonate plasticizer and a melamine concrete superplasticizer, or
  (ii) a dispersing agent of the thickener type (water dispersible polymer), or
  (iii) a combination of a concrete superplasticizer and a dispersing agent of the thickener type, or
  (iv) a combination of any of the systems (i), (ii), and (iii),
the amount of the particles A substantially corresponding to dense packing thereof in the composite material with homogeneously arranged particles B in the voids between the cement particles, the amount of water substantially corresponding to the amount necessary to fill the voids between the particles A, B and C, and the amount of dispersing system being sufficient to impart to the composite material a plastic consistency in a stress field of at the most 200 kg/cm$^2$, preferably at the most 100 kg/cm$^2$.

A further aspect of the invention comprises improvements in connection with rolling of plastically deformable materials, in particular cement-based DSP materials.

Rolling of a plastically deformable material comprises subjecting the material to a hydrostatic pressure which will reduce the thickness of the layer of the material subjected to the rolling. In principle, the rolling is performed by moving the material through a wedge-like space defined between oppositely arranged surface parts. Usually, the wedge-like space is constituted by the space between a roller surface and a plane surface adjacent to the nip between the roller and the plane surface, or by the space between two roller surfaces adjacent to the nip between the rollers.

In connection with the rolling of plastically deformable materials, including DSP materials, it has been found that flaws may occur in the roller material, including scars and other flaws due to parts of the plastically deformable material torn out from the mass to be rolled (because of adherence to the roller) or due to air bubbles entrapped in the surface. Thus, the rolled product may not always show the superior properties aimed at.

It has now been found that this problem may be overcome, and that plastically deformable materials, including DSP materials, may be subjected to rolling or equivalent treatment with excellent results and in an easily controllable and reproducible manner, by a special method which constitutes an aspect of the present invention, and which comprises introducing the material into a wedge-like space defined between oppositely arranged surface parts, of which at least one is gas-permeable, preferably not liquid absorbing, and substantially impervious to said material, and moving said surface parts so as to draw said material towards and through the throat or gorge of said space between said surface parts.

The said one surface part may be the peripheral surface of a roller, the surface having the above-mentioned characteristics, but usually, said surface parts are defined by opposite surface parts of a pair of spaced bands or belts which are, e.g., passed around and backed up by moving rollers and/or stationary guide members.

Preferably, the said one surface part is constituted by a textile web or non-woven tissue made from man-made or natural fibers, such as a web or non-woven tissue made from nylon or aromatic polyamide.

Although the present invention is not to be limited by any theory, it is assumed that the surprising improvement with respect to the performance of the rolling process and the surface properties and characteristics of the resulting rolled product is due to the following combination of effects exerted by the gas-permeable, not liquid absorbing surface layer which is substantially impermeable to the plastically deformable material:

(1) The fact that the surface is gas-permeable will contribute to allow any air bubbles at the surface of the rolled material to escape through the surface and, hence, not become entrapped in the surface.

(2) The surface acts as an intermediate layer which prevents the plastically deformable material from adhering to any solid roller surface such as a metal surface in connection with the plastic deformation. On the other hand, the surface itself, due to its gas-permeability, is relatively easily removed from the rolled material, in particular when the surface is constituted by a band or belt which, after the rolling action, is peeled off the rolled material by being bent away from the material at preferably a sharp angle, (3) Surface defects which are normally encountered in rolling processes due to uncontrolled displacement and shear in the material subjected to the rolling are obviated because a controlled and uniform high shear takes place between the layers of the plastically deformable material immediately adjacent to the surface (which, due to its gas permeability and tissue or web structure, pulls along the surface layers while central portions of the plastically deformed material between the surface layers are not moved forward at the same high rate).

The DSP material which is rolled in accordance with the aspect of the invention described above is preferably a DSP material to which improved processability in plastic deformation has been imparted according to any of the measures of the present invention discussed above.

According to an interesting aspect of the rolling method of the invention, a layer or layers of a fibrous material is incorporated in the plastically deformable material during the rolling process by being supplied to the plastically deformable material prior to the introduction of the plastically deformable material into the wedge-like space. In this embodiment, the fibrous material may comprise one or several layers of loose fibers which are optionally arranged in a desired orientation and/or one or several layers of web, net, or non-woven tissue. By this controlled incorporation of a fibrous material in a desired orientation, an optimum reinforcing effect may be obtained. Thus, one or several layers of web, nets and/or non-woven tissues which are pervious to the plastically deformable material may be introduced into the wedge-like space together with the plastically deformable material in a controlled manner and at a controlled longitudinal introduction velocity so that the web, net, or tissue is arranged substantially unbuckled in longitudinal direction in the resulting rolled sheet.

According to another especially interesting embodiment of the invention, the cross sectional geometry of the feed stream of the plastically deformable material is controlled before introduction of the plastically deformable material into the wedge-like space. In this manner, a very high degree of control of the degree of deformation to which the material is subjected is obtained. The control of the cross sectional geometry of the feed stream of the plastically deformable material may be performed by means of guide members arranged in front of the wedge-like space and limiting the width of the feed stream of the plastically deformable material introduced into the wedge-like space, or the control of the cross sectional geometry of the feed stream of the plastically deformable material introduced into the wedge-like space may be performed by means of guide members defining a desired cross sectional geometry of the feed stream of the plastically deformable mass.

A special embodiment of the control of the cross sectional geometry of the feed stream of the plastically deformable material is performed by subjecting the plastically deformable material to extrusion prior to the rolling. In this case, the extruded plastically deformable material may be rolled in a direction parallel to the extrusion direction, or it may be rolled in a direction transverse to the extrusion direction, depending on the particular effect to be obtained, the orientation of fibers incorporated in the material, etc.

According to a particular aspect of the invention, the sheet resulting from the plastic deformation, in particular the rolling, is subjected to a controlled hydrostatic pressure for a period subsequent to the deformation. The controlled pressure may, e.g., be between 2 and 10 MPa, preferably between 2 and 5 MPa, and may be maintained for a period between 10 minutes to 24 hours, preferably for 2-10 hours. This controlled pressure treatment subsequent to the plastic deformation may reduce the formation of larger pores in the material, thereby improving the strength properties, in particular the bending strength, in the cured matrix.

The thickness of the sheet rolled in accordance with the present invention is typically in the range of 1-40 mm, in particular 2-20 mm, especially 4-10 mm.

After the plastic deformation, the sheet may also be subjected to subdivision and shaping, e.g. by compression shaping, in any desired shape. According to a particular embodiment of the invention, the rolled sheet may be used for the preparation of tubular articles, e.g. by being wound in coiled configuration onto a cylindrical member with contact between the edges of consecutive coils, or, according to a particular aspect of the invention, the rolled sheet may, in connection with the rolling treatment, be wound onto a cylindrical core in superimposing layers to build up a greater thickness of the tube; this latter embodiment is particularly interesting when the sheet is reinforced with fiber material in accordance with the embodiment discussed above.

The invention also relates to an apparatus for rolling a plastically deformable material and comprising rolling members having oppositely arranged surface parts defining a wedge-like space therebetween, at least one of said surface parts being gas permeable, preferably non-liquid absorbing, and substandially impervious to said plastically deformable material.

BRIEF DESCRIPTION OF THE DRAWINGS

The invention will now be described in greater detail with reference to the Examples and to the drawing, in which.

Figure 1:
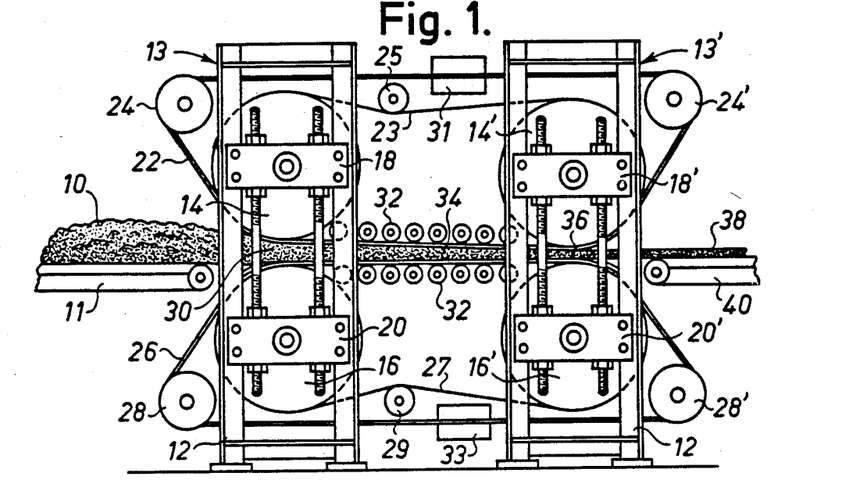
FIG. 1 is a schematic representation of an apparatus according to the invention for rolling a plastically deformable material by the method according to the invention.

In FIG. 1 fresh paste 10, for example of a DSP material of a composition corresponding to the composition given in the Examples, such as Examples 5, 6 and 7, is fed to a roller assembly, in this case consisting of two roller sets 13 and 13', by means of a feeding device such as a belt conveyor 11. From the belt conveyor, the paste enters into the nip between a first set of rollers 14 and 16 mounted in a frame 12 and adjustable in relation to each other by means of adjustable support members 18 and 20. In the embodiment illustrated in FIG. 1, a second set of rollers 14' and 16' is arranged at a distance from the first set of rollers and is otherwise operated and supported in similar manner as the first set of rollers. Round the upper two rollers and the lower two rollers, respectively, two endless sheets 22, 26 move with the same speed as the peripheral speed of the rollers. These endless sheets or bands 22, 26 are supported by auxiliary rollers 24, 24', 28, 28', and in the path between the two sets of rollers, are supported by small supporting rollers 32. If necessary, the sheets 22 are, furthermore, supported by supporting bands 23, 27, the tension of which is adjusted by means of tensioning rollers 25, 29. The sheets 22, 26 are made of a textile web or non-woven tissue, such as nylon web, and is of a type which is gas permeable, non-liquid absorbing, and substandially impervious to the constituents of the paste treated, that is, the mesh or interstices in the sheets are substantially not larger than the particle size of the cement particles in the paste.

The supporting band 23, 27 may, for example, be of the same type of material which is used for driving belts, and must not necessarily show gas permeable characteristics. According to one embodiment, however, only one pair of rollers is employed, whereby the supporting band is avoided. The sheets 22, 26 pass through cleaning stations 31, 33 where any paste entrained is removed, for example by means of brushing devices, optionally assisted by washing with water. The washing stations comprise conditioning means controlling the moisture of the washed sheet to a preselected range.

The paste 10 is plastically deformed to a reduced thickness sheet 30 between the two sheets 22 and 26 in the nip between the rollers 14 and 16 and is thereafter further reduced in thickness between the sheets 22 and 26 as these move increasingly closer to each other, supported by roller sets 32. As will be seen from the drawing, the plastically deformable material first passes through a wedge-like space defined by the nip between the rollers 14 and 16 and the space between the rollers to the left of the nip. A second wedge-like space comprises the nip between the rollers 14', 16' and includes the narrowing space between the roller sets 32 extending to the left of the nip between rollers 14 and 16, or the complete passageway from the start to the left of the nip between rollers 14 and 16 to and including the nip between rollers 14', 16' could be taken as the wedge-like space defined above. As the paste passes through the wedge-like space in FIG. 1, a hydrostatic pressure with resulting plastic deformation is appled to the paste, first by the rollers 14, 16, whereupon the hydrostatic pressure is maintained and further increased by means of the roller sets 32 which, in the embodiment shown in the drawing, exert a slightly increased hydrostatic pressure with resulting plastic deformation of the sheet 34 to a smaller thickness. A final plastic deformation results from the passage of the sheet between the rollers 14' and 16'.

It will be understood that it is within the scope of the invention to perform the complete plastic deformation by means of a single set of rollers 14, 16 with appropriate transporting means. After the final plastic deformation at 36, the finished sheet 38 is transported to a curing treatment or to a further plastic deformation process by means of a conveyor 40. (For example, the plane sheet 38 may be rolled or compressed into a corrugated shape such as is used for roof panels, or it may be compression shaped into any desired three-dimensional shape, for example a roof tile, etc., and/or the sheet may be subdivided into smaller units such as bricks, shingle, slates, etc. When roof panes in the shape of plane sheets are prepared, they are suitably produced with a somewhat rough or irregular back to prevent capillary forces from causing water to be entrained into the interstices between the panels. To avoid efflorescence, the final panels may be painted on one or both sides with a suitable paint in a desired colour, e.g. an aqueous acrylic polymer dispersion.

Figure 2:
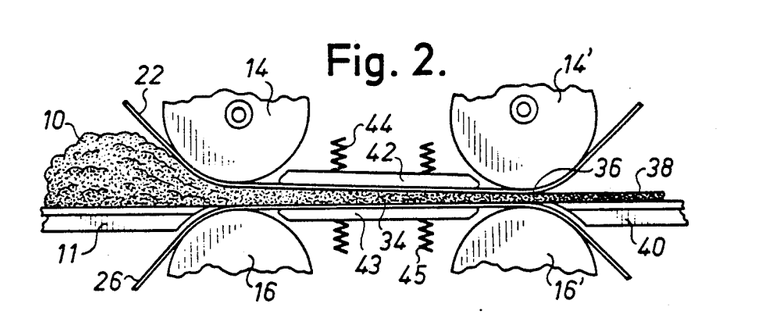
FIG. 2 is a schematic representation of another embodiment of a section of the aparatus shown in FIG. 1, and FIGS. 3 and 4 are enlarged views illustrating the material flow of the nip between two rollers in the apparatus shown in FIG. 1.

In FIG. 2, the supporting roller sets 32 of FIG. 1 are replaced by supporting plates 42, 43 which support the sheets 22 and 26 with a pressure which is adjustable by adjusting the pressure of compression springs 44, 45. In the embodiment shown in FIG. 2, the conveyors 11 and 40 are replaced by support plates 11 and 40 having smooth surfaces giving little friction.

Figure 3:
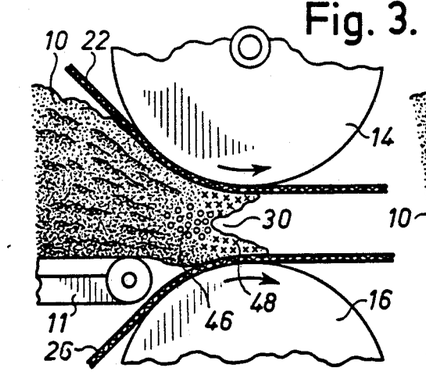
Figure 4:
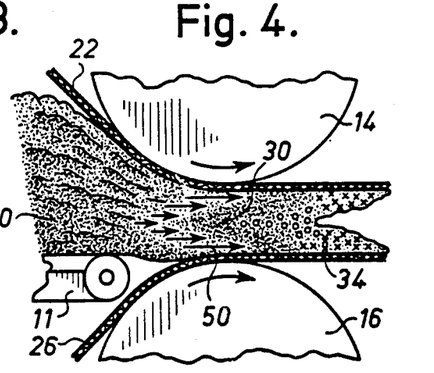

FIGS. 3 and 4 illustrate in detail the character of the plastic deformation in the wedge-like space, the left limitation of which is the position at which the paste comes in contact with the sheet 22, and right limitation of which is the domain at the nip between rollers 14 and 16. (It will be understood that, having passed the wedge-like shape in the same manner as illustrated in FIG. 1, the paste may pass through a further wedge-like space or part of a wedge-like space.)

Although the present invention is not to be limited by any theory, the process which takes place in the wedge-like space is believed to lead to the following improvements:

Due to the hydrostatic pressure established in the wedge-like space and increasing from left to right, a pressure gradient is generated throughout the paste, with maximum pressure in the nip and decreasing pressure towards the beginning of the wedge-like space to the left. This pressure gradient will, in itself, tend to generate a backward flow of the material, the most pronounced effect of this being in the middle of the nip between the two rollers such as illustrated at 30. At the same time, due to the friction between the sheet 22 and the paste, an externally forced displacement of the layers in immediate contact with the sheet 22 takes place, and these layers will substantially move at the same speed as the speed of the rollers. Due to the viscosity and coherence of the paste, the displacement is transferred to the interior of the paste, superseding the backward flow tendency caused by the hydrostatic pressure gradient, thus resulting in a forward flow of the total paste with considerably higher flow speed at the layers adjacent to the sheet than in the interior of the paste. It is believed that one of the main reasons for the advantages and quality improvements associated with the feature of the invention comprising the use of the gas permeable, not liquid absorbing sheet 22 is that because of the much higher friction between the sheet and the paste than between a smooth roller surface and the paste, not only a much faster displacement takes place in the layers of the paste adjacent to the sheet, but also a much more uniform displacement, which means that there will be a substantially uniform shear gradient throughout the paste, contributing to a uniform surface quality after the rolling. Any gas bubbles or domains which would tend to be entrapped between the sheet 22 and the paste will pass through the gas permeable sheet 22, whereby defects ascribable to entrapped air at the surface of the rolled sheet are avoided.

It is of importance that the sheets 22, 26 have a sufficient strength for the purpose. As a guideline, the minimum strength of the sheets should be 100 kp/cm of width. Also, the sheets would be sufficiently resistant to being bent over a "knife edge", that is, they should be capable of being bent minimum 90° over an edge having a radius of curvature of 1 mm.

DESCRIPTION OF THE PREFERRED EMBODIMENTS

The materials used in the Examples are as follows:

Ordinary Portland Cement:
  Specific surface (Blaine): 3300 cm$^2$/g Density 3.12 g/cm$^3$.

Low alkali, sulphate resistant cement:
  Specific surface (Blaine): 3000 cm$^2$/g, C$_3$A content approx. 1.5%.

Fly ash from power plant:
  Fine, spherical particles, parts of which are hollow. Specific surface (Blaine): 2800 cm$^2$/g. Density approximately 2.4 g/cm$^3$.

Elkem Silica:
  Fine spherical SiO$_2$-rich dust, produced as a by-product in the production of silicon metal or ferrosilicon in electrical furnaces. Specific surface (determined by BET technique) about 250,000 cm$^2$/g, corresponding to an average particle diameter of 0.1 μm. Density 2.22 g/cm$^3$. From Elkem, Norway.

Quartz sand:
  Fractioned, natural quartz sand 0-2 mm. Density 2.63 g/cm$^3$.

KRENIT TM fibers:
  Polypropylene fibers made from polypropylene film stretched in a ratio of about 1:17 and fibrillated on a needle roller in analogy with Example 4 in International Patent Application No. PCT/DK79/00047.

Mighty ®:
  A concrete superplasticizer, sodium salt of a highly condensed naphthalene sulphonic acid/formaldehyde condensate, of which typically more than 70% consists of molecules containing 7 or more naphthalene nuclei. Density about 1.6 g/cm$^3$. Available either as a solid powder or as an aqueous solution (42% by weight of Mighty, 58% by weight of water).

Water:
  Common tap water.

Wollastonite:
  Nyad G. A naturally occuring calcium metasilicate CaSiO$_3$ of which 80% has a size equivalent to a sphere diameter of less than 4 μm, and 20% has a size equivalent to a sphere diameter of less than 1 μm.

Melment:
  An anionic melamine resin powder. Available from SKW Trostberg.

Natrosol 250 H4BR
  A non-ionic medium viscosity water soluble polymer derived from cellulose (hydroxy ethyl cellulose ether). The characteristic 2% Brookfield viscosity at 25° C. is 50,000 mPa.s. Other preferred Natrosol 250 types in the medium viscosity range are H4BR, HBR, MHBR and MBR. (The letter B designates improved biological stability obtained by regular substitution of the hydroxy groups, and the letter R designates that the product is readily soluble in water). Available from Hercules.

Cormix SP2
  A concrete superplasticizer based on a soluble salt of polymeric sulphonate. Available from Cormix.

Ball Clay
  895 Ball Clay, comprising about 56% of clay and 24% of micaceous matter, chemical composition predominantly SiO$_2$ and Al$_2$O$_3$, the main clay mineral being kaolinite, particle size distribution: 50% of the particles being finer than 0.3 μm, from English China Clays Sales Co., Ltd.

Carbon black:
  Colour pigment, Kenotone 2 AL.

EXAMPLE 1

(reference example)

Formulation:

| Component | % by weight of dry matter |
|---|---|
| Cement, ordinary Portland cement | 70.9 |
| Elkem Silica | 23.9 |
| 6 mm polypropylene fibers (KRENIT ™) | 1.9 |
| Mighty (dry matter) | 3.3 |
| Water/dry matter | 0.1198 |

Preparation:
Mixer: "Maren", supplied by Effort, Kolding, Denmark, 16 liters of dough mixer with planetary movement.
Paste preparation:
(1) The dry material was mixed for 3 minutes.
(2) Water and dispersing agent were added and mixed for 10 minutes whereby the material was formed into a dough. When the dough consistency was reached, the fibers were added and further mixing took place for about 3 minutes.
Shaping:
Members were produced by pressing in a laboratory single screw extruder (type "H/ändle", Strengpresse). The dough was extruded twice and the hydrostatic pressure in the die was about 0.6 MPa. The dimension of the die was 40×10 mm.
Test specimens of dimensions 10 mm×40 mm×210 mm were prepared.
Curing:
The specimens were cured for 24 hours under a plastic film. Thereafter,
the specimens were cured in water until testing took place.
Testing:
The testing was performed as a four point bending test in a Zwick universal testing machine.
Test results:

| Properties (after 7 days of curing) | |
|---|---|
| Density (dry), kg/dm³ | 2.06 |
| Bending strength of matrix, MPa | 12.1 |
| Modulus of rupture, MPa | 20.1 |
| Elongation at break, o/oo | 14.2 |

Other properties:
Frost resistance.
By means of microcalorimetry it was found that the amount of freezable water at temperatures above −30° C. was zero.
Pore structure analysis:
By means of quantitative microscopy, the pore size distribution was obtained according to ASTM C 457 modified for automatic quantitative microscopy. The theoretical pore size distribution by volume was calculated according to Lord and Willis.
Total volume of pores larger than 7.5 μm in percentage of total volume: 1.93%.
Percentage of pores by volume greater than:

| | |
|---|---|
| 2000 μm: | 0.0% |
| 350 μm: | 1.08% |
| 97 μm: | 1.38% |
| 52.2 μm: | 1.70% |
| 22.4 μm: | 1.79% |

EXAMPLE 1(a)

Specimens were prepared as described in Example 1 using the following formulation:

| Component | % by weight of dry matter |
|---|---|
| Ordinary Portland Cement | 67.8 |
| Elkem Silica | 22.9 |
| 6 mm E-glass fibers | 6.0 |
| Mighty (dry matter) | 3.3 |
| Water/dry matter | 0.12 |

The pore size distribution of the cured material was obtained according to the method mentioned above with the following result:
Total volume of pores larger than 7.5 μm in percentage of total volume: 1.37%.
Percentage by volume of pores greater than:

| | |
|---|---|
| 2000 μm: | 0.0% |
| 350 μm: | 0.0% |
| 97 μm: | 0.65% |
| 52.2 μm: | 0.95% |
| 22.4 μm: | 1.18% |

EXAMPLE 2

Formulation:

| Component | % of dry matter |
|---|---|
| Cement, ordinary Portland cement | 67.2 |
| Elkem silica | 22.4 |
| 6 mm polypropylene fibers, (KRENIT ™) | 1.8 |
| Wollastonite, Nyad G | 5.5 |
| Mighty | 3.3 |
| Water/dry matter ratio | 0.1337 |

The preparation was performed as described in Example 1. However, wollastonite+dry powder were mixed for 3 minutes, and the extrusion pressure was 1.0–1.2 MPa.
Test results:

| Property | After 7 | 28 | 90 | 180 days |
|---|---|---|---|---|
| Dry density, kg/dm³ | 2.08 | 2.13 | 2.12 | 2.11 |
| Bending strength of matrix, MPa | 20.6 | 22.0 | 22.0 | 20.5* |
| Modulus of rupture, MPa | 23.1 | 23.8 | 24.0 | 23.3* |
| Elongation at break, o/oo | 8.5 | 7.7 | 5.5 | 6.2 |

*The figure does not differ significantly from the 90 day strengths.

Evaluation:
Compared to Example 1, the experiments indicated
(1) improved processability in extrusion (lower necessary extrusion pressure, improved internal coherence). This is believed to be due to the presence of wollastonite.
(2) A smoother surface with a less amount of surface defects.

(3) A prolonged pot life, which means that the paste remains plastic to the extent necessary for low pressure extrusion. In comparison with the paste prepared according to Example 1, the pot life of the paste prepared in this example was prolonged by a factor of 4–5.

(4) The bending strength of the matrix was increased by some 50%.

EXAMPLE 3

Formulations 1 and 2:

| Component | 1 | 2 |
|---|---|---|
| | % by weight of dry matter | |
| Cement, ordinary Portland cement | 68.6 | 63.3 |
| Elkem Silica | 29.4 | 27.2 |
| 6 mm polypropylene fibers, (KRENIT ™) | 2.0 | 1.8 |
| Wollastonite, Nyad G | — | 7.7 |
| Mighty | 4.15 | 3.8 |
| Water/dry matter ratio | 0.140 | 0.136 |

Preparation:
Mixer: LAEIS, PZM 1000, with a 1000 liter vessel, and water spray.
Batch size:

| | Formulation 1 | Formulation 2 |
|---|---|---|
| Dry matter | 802 kg | 869 Kg |

Mixing procedure:
The dry matter was mixed for 5 minutes whereafter water and Mighty were added, and mixing was continued for a further 2 minutes. Thereupon, the fibers were added to the mix, and further mixing was performed for 8 minutes to obtain a stiff nodule-like appearance of the mix. Thereupon, the mixture was passed twice through a twin screw continuous kneader of the type "Händle" MDZ25A.

Extrusion:
Extrusion was performed in a "Händle Strengpresse" PZM45B, 350 mm barrel, under vacuum. The die pressure was 3.4 MPa when extruding formulation 1, while 1.3 MPa was sufficient when extruding formulation 2.

Evaluation:
As appears from the above, the use of wollastonite permitted the use of a lower die pressure to obtain a material of an equally good quality.

EXAMPLE 4

Formulation:

| Component | Weight, g |
|---|---|
| Cement | 7350 |
| Elkem Silica | 2450 |
| Melment 10 (powder) | 171 |
| Dispersing agent Cormix SP2 (liquid) | 408 |
| KRENIT ™, 6 mm | 200 |
| Water | 1300 |

Preparation:
The preparation was performed as described in Example 1.
Test results:

| Property | After (days) | |
|---|---|---|
| | 7 | 28 |
| Dry density, kg/dm³ | 2.01 | 2.00 |
| Bending strength of matrix, MPa | 13.9 | 15.7 |
| Modulus of rupture, MPa | 21.4 | 22.0 |
| Elongation at break, o/oo | 9.4 | 8.3 |

Evaluation:
As compared to Example 1, the combination of the two particular dispersing agents at a lower dosage than Mighty results in the same strength characteristic as when using Mighty.

EXAMPLE 5

| Components | % by weight |
|---|---|
| Portland cement | 12.3 |
| Low alkali, sulfate-resistant cement | 49.4 |
| Elkem silica | 18.5 |
| Wollastonite, Nyad G | 13.0 |
| Ball clay | 5.0 |
| Mighty | 1.0 |
| Polypropylene fibers, 6 mm | 1.8 |
| "Natrosol" 250 H4BR | 0.04 |
| Water/dry matter ratio | 0.162 |

Preparation:
The preparation was performed as described in Example 1.

Production of sheets.
About 6 mm thick sheets were prepared from the dough by means of a laboratory two roll calendering apparatus. The fresh dough was placed on a flat metal sheet. The sheet was provided with frames so that an appropriate hydrostatic pressure could be achieved in the material during the shaping process.

Experiments were performed by calendering the material without or with an intermediate gas-permeable, non liquid absorbing layer substantially impervious to the DSP material (fine mesh nylon fiber web), between the material and the calender, the intermediate layer being placed on top of the fresh material before performing the calendering process.

The sheets prepared without using the intermediate layer had scarred and defective surfaces owing to torn out parts and to inadequate filling of the surface (entrapped air).

The sheets prepared using the intermediate layer had no defects.

Specimens were cut out of the sheets for mechanical testing. The size of the specimens was about 76.5×6×210 mm.

| | Results | | | |
|---|---|---|---|---|
| | Without intermediate layer | | With intermediate layer | |
| | Orientation of the test body in relation to the direction of production | | | |
| | Parallel | Transverse | Parallel | Transverse |
| Density, kg/dm³ | 2.00–2.09 | | 2.00–2.09 | |
| Modulus of rupture, MPa | 17–25 | 9–14 | 20–31 | 12–27 |
| Elongation at break, o/oo | 0.4–0.8 | 0.4–0.6 | 0.7–4.8 | 0.6–4.3 |

From the above results, it appears that not only an improvement of the surface quality of the sheets, but also an improvement of the mechanical properties is obtained when using the intermediate layer between the material and the calender roll in accordance with the principles of the present invention.

EXAMPLE 6

Sheets of the dimensions 300×600×4 mm were produced by rolling a pre-extruded string of material (dimensions 15×150 mm). The directions of extrusion and rolling were identical Formulation:

| Component | % by weight of dry matter | | |
|---|---|---|---|
| | Sample 1 | Sample 2 | Sample 3 |
| Low alkali, sulphate resistant cement | 37.8 | 33.9 | 46.8 |
| Fly ash | 24.9 | 15.9 | 10.0 |
| Quartz sand 0.4–1 mm | — | 19.9 | — |
| Elkem Silica | 21.0 | 15.9 | 20.9 |
| Wollastonite, Nyad G | 13.9 | 12.0 | 19.9 |
| KRENIT ™ | 1.0 | 1.0 | 1.0 |
| Mighty, (dry matter) | 1.0 | 1.0 | 1.0 |
| Carbon black | 0.4 | 0.4 | 0.4 |
| Water/dry matter ratio | 0.098 | 0.087 | 0.097 |

Preparation:
Mixer:
Samson, supplied by Hans Jensen, Hadsund, Denmark. A 27 liter dough mixer with planetary movement.

Mix preparation:
Cement, fly ash, quartz sand, Elkem Silica, Mighty, carbon black and water were mixed for 12 minutes. Wollastonite was then added and mixing continued for 7 minutes. Finally Krenit-fibres were added and mixing continued for another 7 minutes.

Kneading:
The dough was kneaded for approx. 10 minutes in a kneading mixer, type K III 100 A, supplied by Hermann Linden Maschinenfabrik GmbH, BRD.

Processing:
The dough was extruded by low pressure in a continuous string. This string was fed into a rolling machine like the one described in connection with FIG. 1 and rolled into a continuous sheet of cross sectional dimensions 340×4 mm. Rolling speed appprox. 6 m/minute. Finally the continuous sheet was cut into sheets of 300×600 mm by means of smooth, fast rotating cutting discs. These sheets were cured as described below.

Curing:
Samples 1 and 3 at 60° C., 100% RH for 16 hours, then for 7 days at 20° C., wrapped into plastics. Sample 2 was autoclaved for 16 hours at 120° C., then for 3 day at 20° C., 60% RH.

Test results:

| | Sample 1 | Sample 2 | Sample 3 |
|---|---|---|---|
| | Orientation of the test body in relation to the direction of production: | | |
| | par./transv. | par./transv. | par./transv. |
| Modulus of rupture, MPa | 26  18 | 25  18 | 31  20 |
| Density kg/dm³ | 2.03 | 2.12 | 2.14 |

EXAMPLE 7

Formulation:

| Material | Amounts in % by weight of dry matter Test no. | | | | |
|---|---|---|---|---|---|
| | 812-1 | 812-2 | 812-3 | 812-3-1 | 812-3-2 |
| Low alkali, sulphate resistant cement | 63.7 | 61.5 | 61.5 | 63.6 | 61.5 |
| Elkem Silica | 21.3 | 18.5 | 18.5 | 21.3 | 18.5 |
| Ball clay | — | 5.0 | 5.0 | — | 5.0 |
| Wollastonite Nyad G | 15.0 | 15.0 | 15.0 | 15.0 | 15.0 |
| Mighty | 1.0 | 1.0 | 1.0 | 1.0 | 1.0 |
| Natrosol 250 H4BR | — | 0.02 | 0.06 | 0.06 | — |
| Water/dry matter | 0.093 | 0.127 | 0.147 | 0.118 | 0.123 |

Test results:
Heat curing 16 hours at 60° C. wrapped in plastic

| Curing method | Test No. | Density kg/dm³ | Modulus of Rupture, MPa |
|---|---|---|---|
| 1 | 812-1 | 2.26 | 29.2 |
| 1 | 812-2 | 2.16 | 26.9 |
| 1 | 812-3 | 2.08 | 26.6 |
| 1 | 812-3-1 | 2.19 | 31.6 |
| 1 | 812-3-2 | 2.10 | 29.6 |

Autoclaving 60 hours at 125° C.:

| Curing method | Test No. | Density kg/dm³ | Modulus of Rupture, MPa |
|---|---|---|---|
| 2 | 812-1 | 2.31 | 39.2 |
| 2 | 812-2 | 2.27 | 35.4 |
| 2 | 812-3 | 2.27 | 36.4 |
| 2 | 812-3-1 | 2.28 | 48.0 |
| 2 | 812-3-2 | 2.19 | 33.3 |

Reference, 7 days in water:

| Curing method | Test No. | Specific weight kg/dm³ | Modulus of Rupture, MPa |
|---|---|---|---|
| 3 | 812-1 | 2.32 | 26.6 |

Preparation:
The preparation was performed as described in Example 1.

Preparation of Test Specimens:
Extrusion was performed as described in Example 1. The test specimens had the following dimensions: 10 mm×40 mm×210 mm.

Curing:

Method 1

The test specimens were wrapped in plastic immediately after the extrusion. About 2 hours later, they were placed in an oven for 16 hours at 60° C. for heat curing. The specimens were then stored at ambient temperature and normal pressure and tested after 7 days.

Method 2

The test specimens were stored under plastic for 24 hours subsequent to the extrusion. They were then autoclaved for 60 hours at 125° C. and a pressure of 2 atmospheres. The test specimens were stored at ambient temperature and normal pressure and tested after 7 days.

Method 3

The test specimens were stored under plastic 24 hours after the extrusion. They were then stored in water and tested after 7 days.

Testing:

The testing was performed in a Zwick universal testing machine, and a 4 point bending test was performed. The following results were obtained:

1. The reference sample 812-1 shows the strength level which can be obtained using the formulation of the present invention and a suitable curing method, the level being 26-30 MPa (modulus of rupture). It appears from all of the formulations that the amount of dispersing agent (Mighty) has been minimized compared to the general level for DSP, cf. Example 1. The use of this low content of Mighty is rendered possible by the use of appropriate combinations of cement type, dispersing agent, wollastonite, and/or ball clay, in accordance with the principles of the present invention.
2. As appears from formulation 812-1, the water/dry matter ratio is very small. This exact water/dry matter ratio is necessary in this formulation in order to achieve an adequate consistency for extrusion using the said formulation. However, this extremely low water/dry matter ratio leads to serious problems in controlling the consistency of the material, and the material when shaped by plastic deformation appears with a cracky, crusty surface.
3. As appears from the table, use of NATROSOL 250 H4BR and/or ball clay or combination thereof makes it possible to increase the water content without destroying the processing characteristics of the material. Furthermore, it appears from the table that the mechanical properties of the material are substantially unaffected.

By using these measures, a prolonged pot life of the material in relation to low pressure extrusion is obtained. For example, formulation 812-3 retains its extrusion consistency 3-5 times longer than does 812-1.

4. Also, it appears from the above test results (formulation 812-3-1) that it is possible to combine the obtainment of such a material composition which is optimal for plastic deformation with the obtainment of good strength properties in the cured state.

EXAMPLE 8

Formulation:
The same as 812-1 in Example 7 was used. Preparation of the dough: 2 methods were used:

(1) Silica was intensively dispersed in water (about 60% dispersion) for 25 min. in a dissolver of the type DIAF. The temperature of the water was 80° C. This slurry was then added to the dough mixer as mentioned in Example 1 and the further mixing procedure was the same as in Example 1.

(2) Same procedure as (1), but the temperature of the water was 20° C. Furthermore, Mighty was added from the start of of the dispersing process. After 25 minutes of dispersing, about 50% of the cement was added and mixing was continued for further 5 minutes. Thereafter the same method as described in (1) and Example 1 was performed.

Lengths of the material were extruded as described in Example 1 and specimens were cut for curing as described in Example 7, curing method no. 2.

Specimens were tested after 3 days in a 3 point bending test tensometer.

Results:

The specimens prepared according to method (1) had a dry density of 2.27 kg/dm$^3$ and a modulus of rupture of 30.5 MPa.

The specimen prepared according to method (2) had a dry density of 2.32 kg/dm$^3$ and a modulus of rupture of 36.7 MPa.

This example shows that denser packing and an increased modulus of rupture can be achieved by improved dipsersing techniques. As compared to the level of the moduli of rupture obtained for the basic formulation 812-1 of Example 6, the strength was increased by some 40 to 50% when the special dispersion technique of the present Example was applied. This is presumably due to the breaking up of particle agglomerates during the intensive dispersing, resulting in more densely packed particles and less incidence of macro-defects in the material and shaped articles made therefrom.

We claim:

1. A method of rolling a plastically deformable material, viz., a material which behaves as a single phase which is deformed plastically when subjected to deformation forces, which comprises:
   (a) compounding a plastically deformable composite material comprising the following constituents:
      (A) inorganic solid particles of a material selected from the group consisting of hydraulic cement, fly ash, and mixtures thereof, said particles having a size of from 0.5 to 100 $\mu$m;
      (B) silica particles having a size of from 50 Å to 0.5 $\mu$m and being at least one order of magnitude smaller than the cement/fly ash particles A; a surface-active dispersing system; and water;
   the amount of the particles A constituting from B 40% to 70% by weight of the composite material and substantially corresponding to dense packing thereof with the particles B being homogeneously arranged in the voids between the cement/fly ash particles A, the amount of water constituting from 7-20% by weight of the composite material and substantially corresponding to the amount necessary to fill the voids between the solid particles of the composite material, and the dispersing system being present in an amount sufficient to impart to the composite material a plastic consistency in a stress field of up to 200 kg/cm$^2$;
   (b) introducing the composite material into a wedge-like space defined between oppositely arranged surface parts, at least one of said parts being gas-permeable and substantially impervious to said material; and
   (c) moving said surface parts so as to entrain the material towards and through the throat or gorge of said space,
   the composite material retaining substantially all of its original water content after steps (b) and (c) and continuing to behave as a one-phase plastically deformable material.

2. The method of claim 1, wherein said one surface part is the peripheral surface of a roller.

3. The method of claim 2, wherein said surface parts are defined by opposite surface parts of a pair of spaced bands or belts.

4. The method of claim 1, wherein said one surface part is constituted by a textile web or non-woven tissue made from man-made or natural fibers.

5. The method of claim 1, wherein the cross sectional geometry of the feed stream of the plastically deformable material is controlled before introduction of the plastically deformable material into the wedge-like space.

6. The method of claim 1, wherein the control of the cross sectional geometry of the feed stream of the plastically deformable material is performed by subjecting the plastically deformable material to extrusion prior to the rolling.

7. The method of claim 6, wherein the extruded plastically deformable material is rolled in a direction parallel to the extrusion direction.

8. The method of claim 1, wherein the sheet resulting from the rolling is subjected to a controlled hydrostatic pressure for a period subsequent to the deformation.

9. The method of claim 8, wherein the controlled pressure is between 2 and 10 MPa and is maintained for a period from 20 minutes to 24 hours.

10. The method of claim 1, wherein the particles A comprise hydraulic cement.

11. The method of claim 10, wherein the particles A additionally incorporate fly ash in an amount of 15–40 percent by weight of the composite material.

12. The method of claim 1, wherein the particles B constitute 5–30 percent by weight of the composite material.

13. The method of claim 1, wherein the particles B are particles of ultrafine silica having a specific surface area of 50,000–2,000,000 cm$^2$/g.

14. The method of claim 1, in which the plastically deformable composite material further incorporates particles of a solid plasticizing agent C.

15. The method of claim 14, wherein the particles C are ball clay particles.

16. The method of claim 1, in which the plastically deformable composite material further incorporates additional bodies D having an aspect ratio of 3:1–100:1 and a diameter of the order of 0.5–10 μm.

17. The method of claim 16, wherein the bodies D are smooth rod-like or acicular bodies.

18. The method of claim 1, in which the plastically deformable composite material further incorporates reinforcing fibers E having an aspect ratio of at least 100:1.

19. The method of claim 1, wherein the dispersing system comprises:
(i) a concrete superplasticizer,
(ii) a water dispersible polymer thickener, or
(iii) a mixture of a concrete superplasticizer and a water dispersible polymer thickener.

20. A method of rolling a plastically deformable material, viz., a material which behaves as a single phase which is deformed plastically when subjected to deformation forces, which comprises:
(a) compounding a plastically deformable composite material comprising the following constituents:
(A) from 40 to 70% by weight of inorganic solid particles of a material selected from the group consisting of hydraulic cement, fly ash, and mixtures thereof, said particles having a size of from 0.5 to 100 μm;
(B) from 5 to 30% by weight of ultrafine silica particles having a size of from 50 Å to 0.5 μm and being at least one order of magnitude smaller than the cement/fly ash particles A;
(C) from 2 to 10% by weight of a solid plasticizing agent;
(D) from 5 to 30% by weight of smooth rod-like or acicular bodies having an aspect ratio of from 3:1 to 100:1 and a diameter of the order of 0.5 to 10 μm;
(E) from 0.5 to 10% by weight of reinforcing fibers having an aspect ratio of at least 100:1; a surface-active dispersing system; and from 7–20% by weight water;
the cement/fly ash particles A being densely packed with the particles B being homogeneously arranged in the voids therebetween, the amount of water substantially corresponding to the amount necessary to fill the voids between the solid particles of the composite material, and the dispersing system being present in an amount sufficient to impart to the composite material a plastic consistency in a stress field of up to 200 kg/cm$^2$;
(b) introducing the composite material into a wedge-like space defined between oppositely arranged surface parts, at least one of said parts being a gas-permeable band which is substantially impervious to said material;
(c) moving said surface parts so as to roll the material towards and through the throat or gorge of said space,
the composite material retaining substantially all of its original water content after steps (b) and (c) and continuing to behave as a one-phase plastically deformable material; and
(d) peeling the gas-permeable band off the rolled material by bending it away from the material at a sharp angle.

* * * * *